Figure 4:
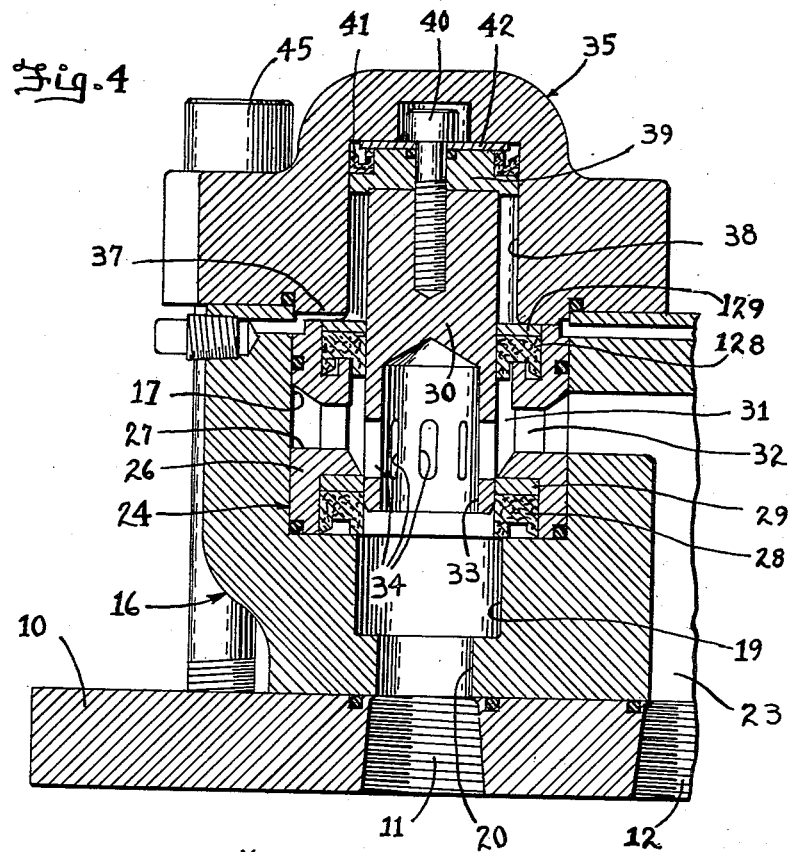

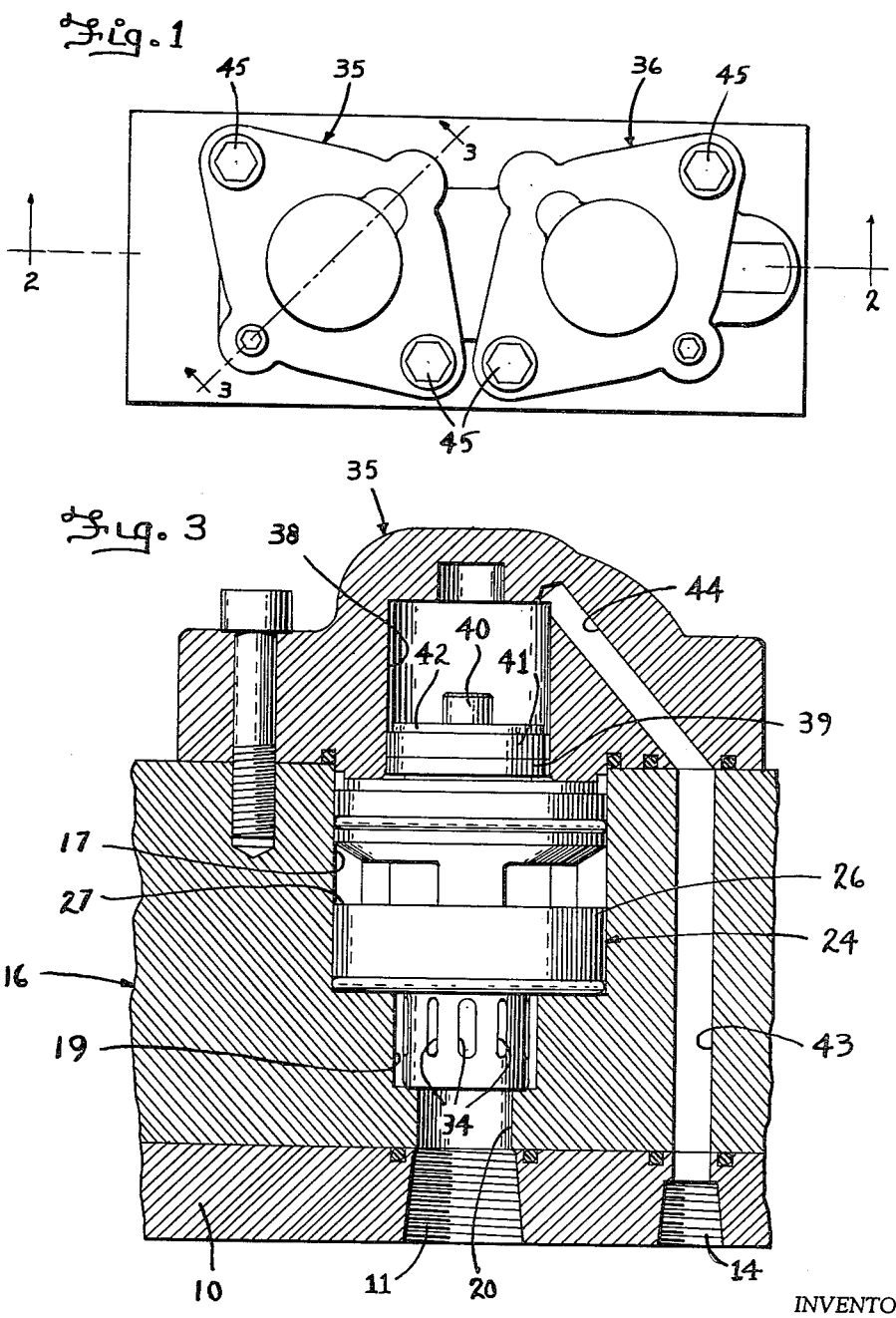

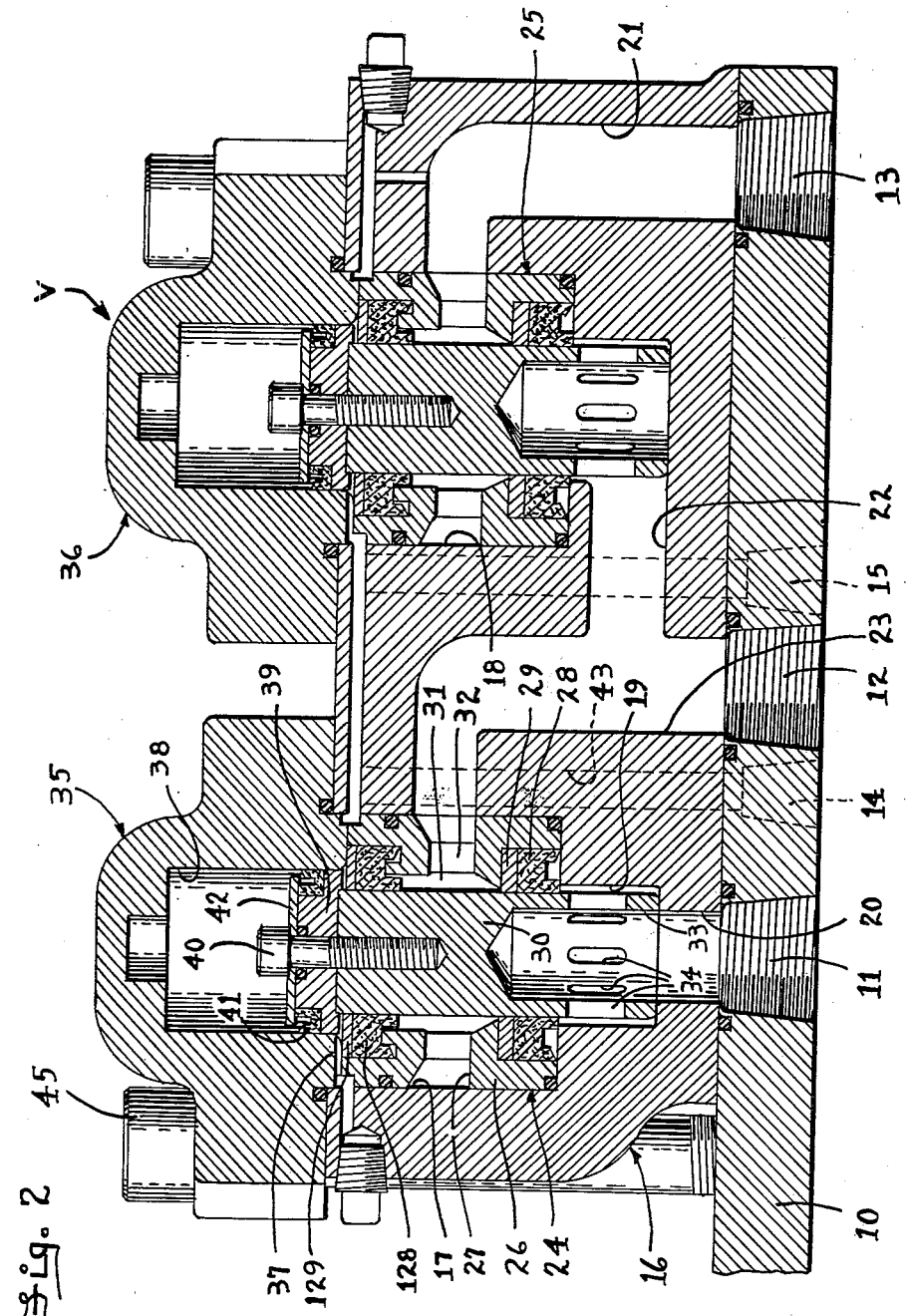

June 25, 1963    N. C. HUNT    3,095,176
FLUID CONTROL VALVES
Filed Jan. 29, 1959    7 Sheets-Sheet 3

INVENTOR.
NATHAN C. HUNT
BY
Attorney

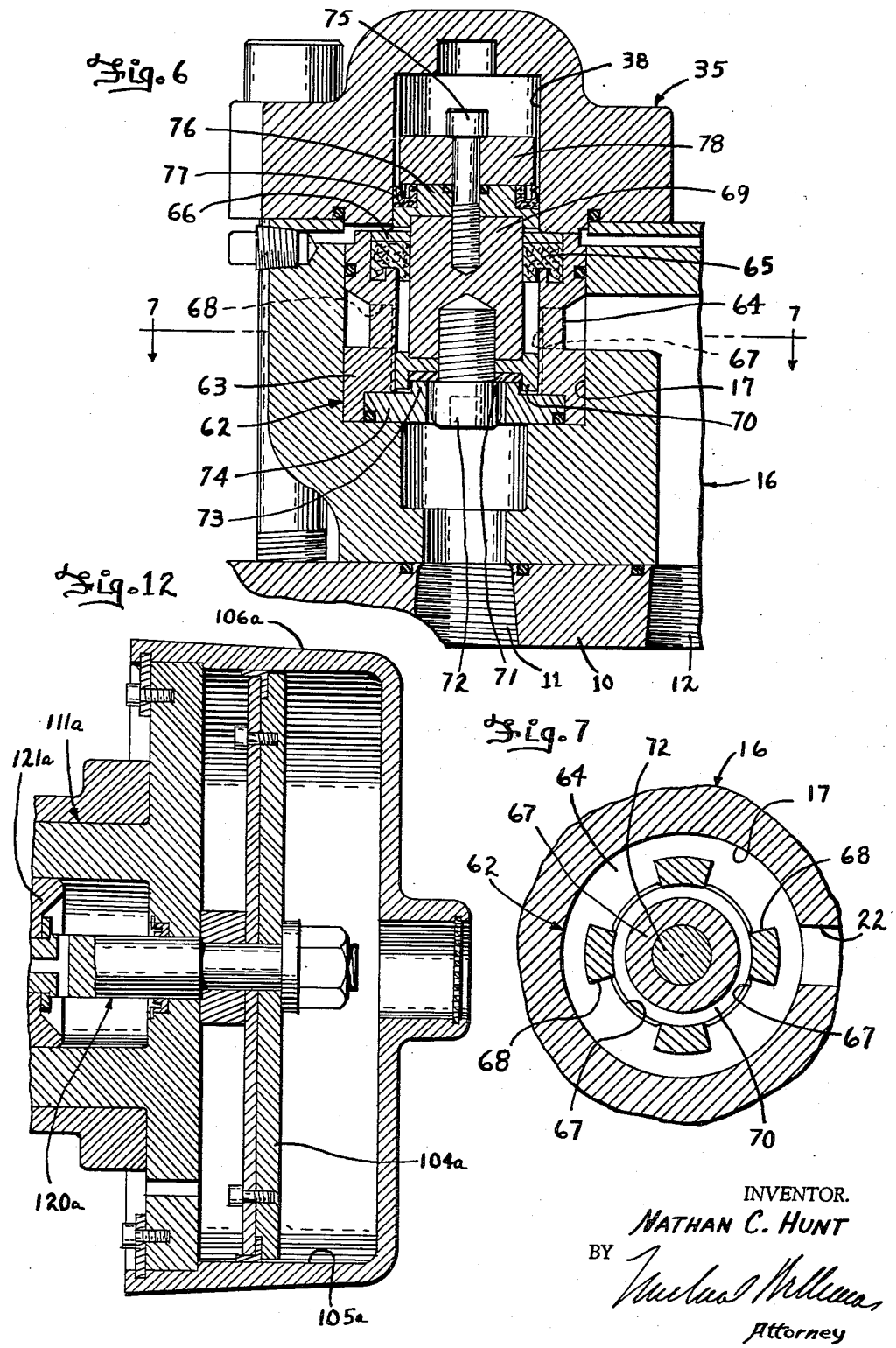

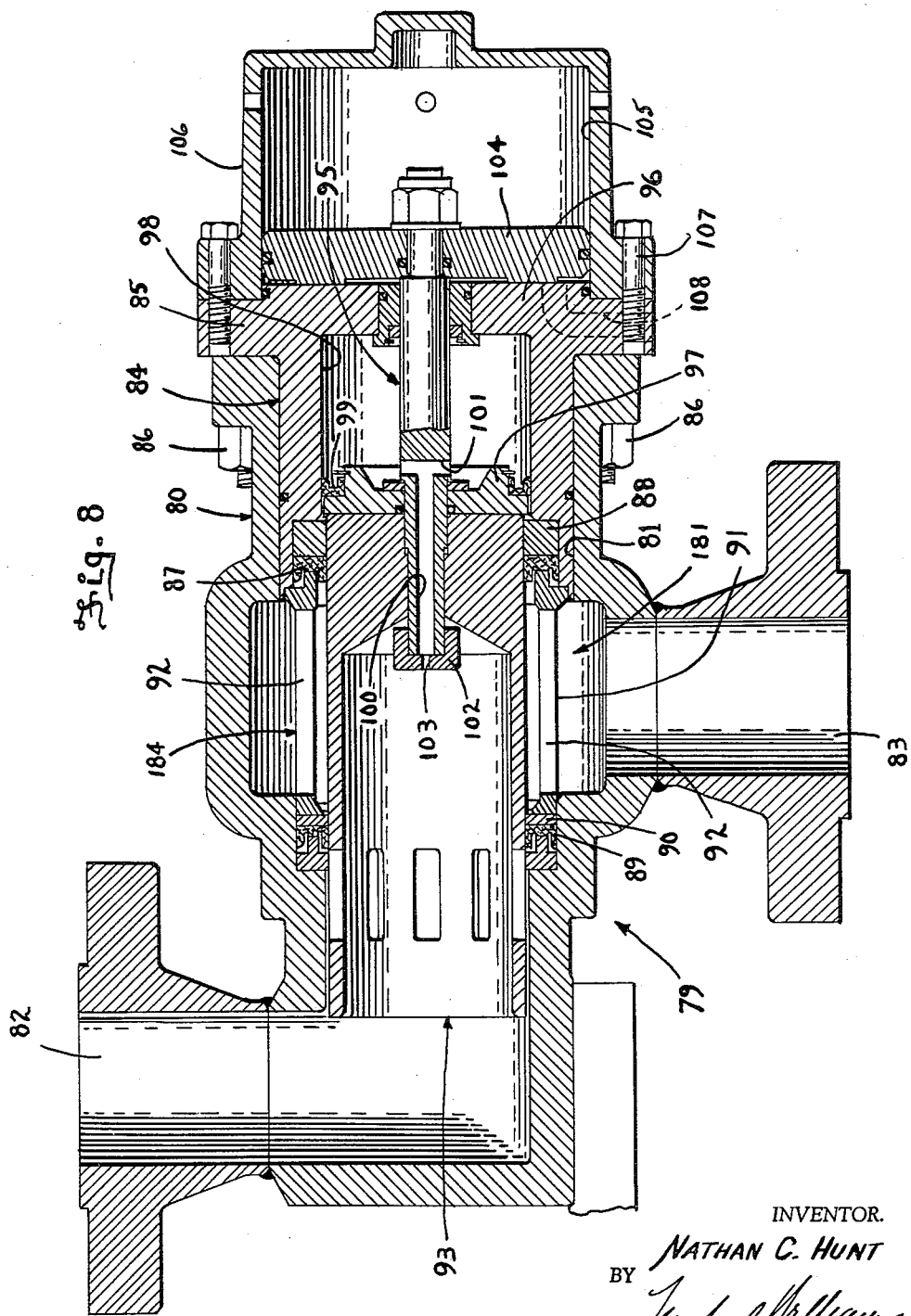

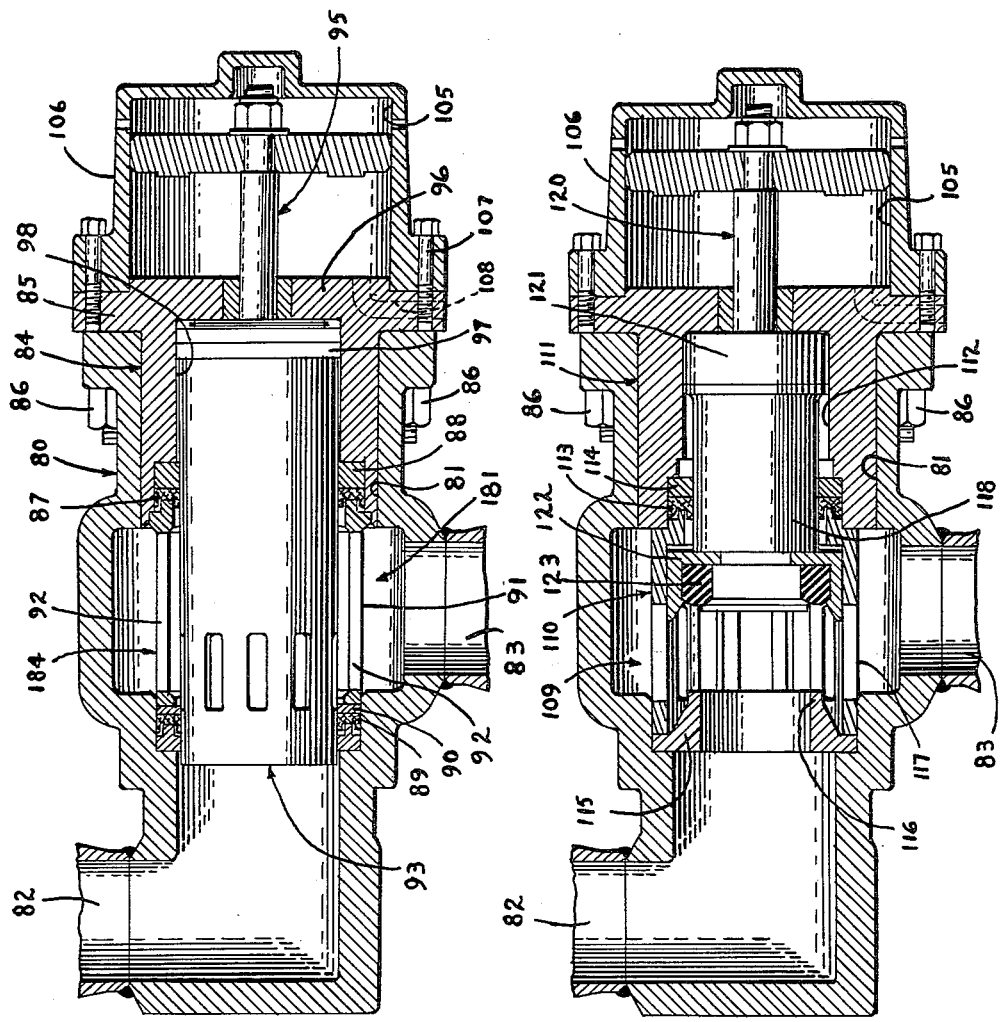

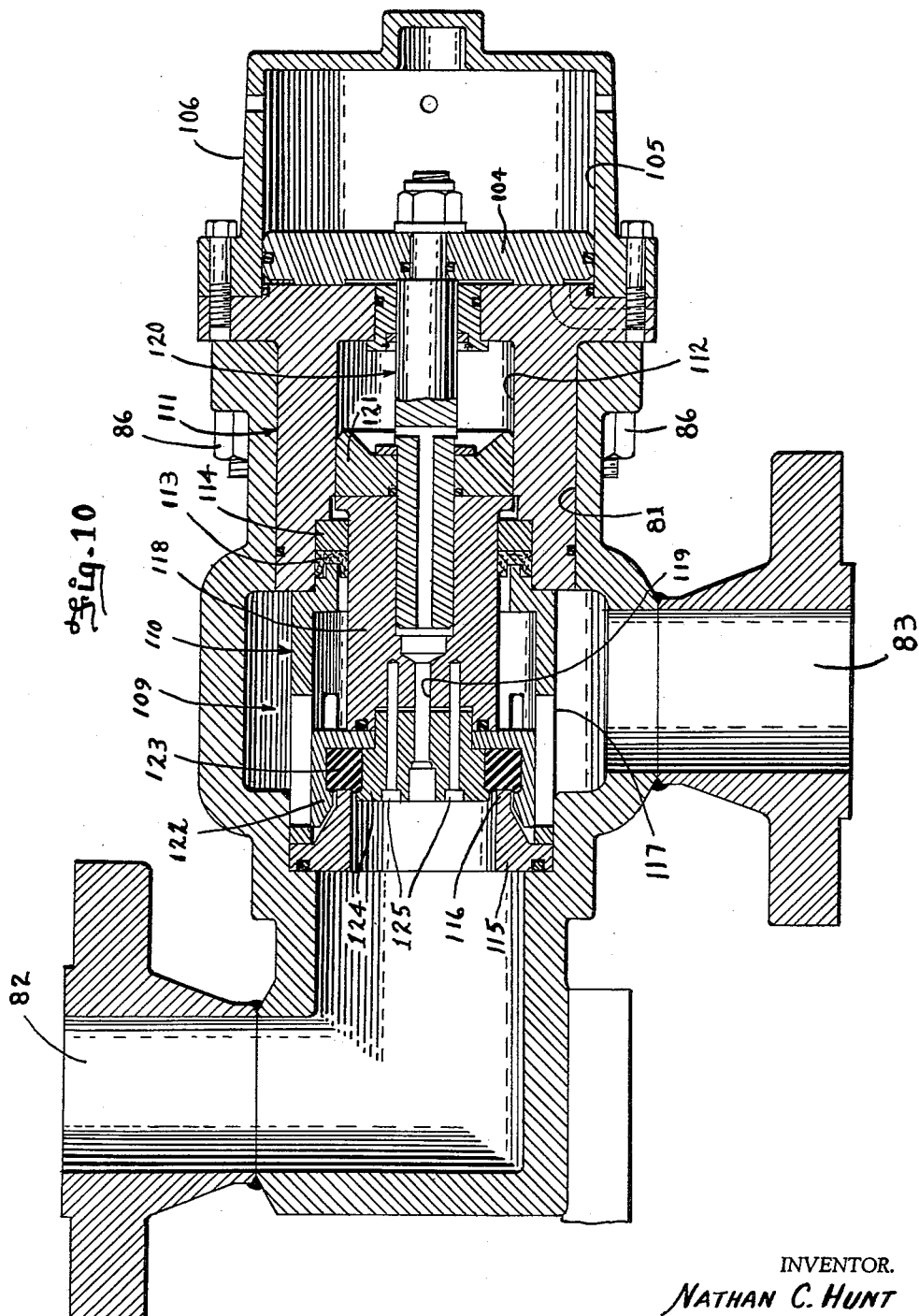

3,095,176
Patented June 25, 1963

3,095,176
FLUID CONTROL VALVES
Nathan C. Hunt, Salem, Ohio, assignor, by mesne assignments, to International Basic Economy Corporation, New York, N.Y., a corporation of New York
Filed Jan. 29, 1959, Ser. No. 789,894
8 Claims. (Cl. 251—62)

The present invention relates to fluid control valves, more particularly to fluid control valves which are biased by fluid pressure to a predetermined position and to values which are readily convertible in the field from one type of valve operation to another, and the principal object of the invention is to provide new and improved valves of the character described.

The majority of fluid control valves in use at the present time may be divided into two classes: i.e., poppet type valves and plunger type valves. In the former type, a valve head is movable toward and away from engagement with a seat to respectively prevent flow of fluid through the valve and to provide for such fluid flow. In the latter type, an elongated plunger member, usually hollow and having one or more transverse apertures therein, is shiftable longitudinally to align and misalign its apertures with fixedly positioned ports to respectively provide for flow of fluid through the valve and to prevent such fluid flow.

Each of the abovementioned valve types has its own advantages and disadvantages. Accordingly, for certain applications and under certain conditions, one type may prove better suited than the other.

In the past, in order to provide complete market coverage, it has been necessary for a manufacturer to build and for a dealer to stock, separate and complete valves of both types. As will be evident, this is quite costly. The present invention has as a principal object the reduction of the number of different parts required to make available both types of valves. As will later be disclosed in detail, this is accomplished by providing a single valve body into which either a poppet type valve assembly or a plunger type valve assembly may readily be disposed depending upon the type valve required. These and other advantages will readily become apparent from a study of the following description and from the drawings appended hereto.

Figure 5:
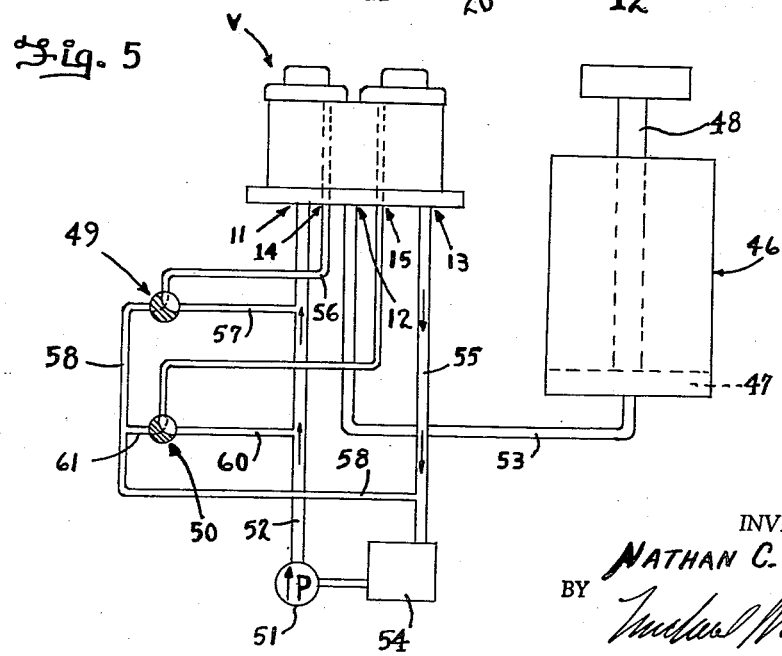

In the drawings accompanying this specification and forming a part of this application there is shown, for purpose of illustration, embodiments which the invention may assume, and in these drawings:

FIGURE 1 is a top plan view of a fluid control valve constructed in accordance with a preferred embodiment of the present invention, FIGURE 2 is an enlarged sectional view generally corresponding to the line 2—2 of FIGURE 1, FIGURE 3 is an enlarged sectional view generally corresponding to the line 3—3 of FIGURE 1, FIGURE 4 is a fragmentary view, similar to FIGURE 2, but showing certain parts in another position, FIGURE 5 is a diagrammatic view illustrating use of the valve seen in FIGURES 1 through 4, FIGURE 6 is a fragmentary view, similar to FIGURE 2, but showing the substitution of a different valve assembly, FIGURE 7 is a fragmentary sectional view generally corresponding to the line 7—7 of FIGURE 6, FIGURE 8 is a sectional view through a valve constructed in accordance with another embodiment of the invention, FIGURE 9 is a reduced size view, similar to FIGURE 8, but showing certain parts in another position, FIGURE 10 is a view similar to FIGURE 8, but showing the substitution of a different valve assembly, FIGURE 11 is a reduced size view, similar to FIGURE 10, but showing certain parts in another position, and FIGURE 12 is a fragmentary view, similar to FIGURE 10, but of a somewhat modified construction.

In the embodiment of the invention seen in FIGURES 1 through 7, and as best shown in FIGURE 2, the valve V therein disclosed comprises a plate-like base member 10 having a plurality of ports 11, 12, 13, 14 and 15 to which suitable fluid-carrying pipes are to be connected. Base 10 may be more or less permanently mounted upon a suitable support in any convenient manner. As will later be more fully disclosed, port 11 is an inlet port adapted to be connected to a suitable source of fluid pressure, port 12 is an outlet port adapted to be connected to any suitable device to which fluid is to be selectively passed, and port 13 is an exhaust port. Since the present valve is adapted to control hydraulic fluid, the exhaust port will be connected to return the exhausted fluid to the pressure source usually provided by a pump or the like. In the event, however, that the fluid being controlled is air, port 13 could merely discharge the exhausted fluid to the atmosphere.

Secured against the upper (in the position of parts viewed) face of plate 10 is a valve body 16 having a pair of valve chambers 17, 18 in side-by-side relation entering from its upper surface. These valve chambers are identical and each terminates at its lower end in a reduced size portion 19. A passage 20 is formed in the body 16 to place the portion 19 of chamber 17 in communication with inlet port 11 of the base and a passage 21 places the main portion of chamber 18 in communication with exhaust port 13 of the base. A passage 22 places the main portion of chamber 17 in communication with the portion 19 of chamber 18 and a branch passage 23 places passage 22 in communication with outlet port 12 of the base. As presently disclosed, suitable O-rings are trepanned into the upper surface of the base 10 for engagement with the mating lower surface of the valve body 16 as shown to insure against fluid leakage.

Still referring to FIGURE 2, there is shown disposed in respective valve chambers 17, 18, plunger type valve assemblies 24, 25. Since, as seen in this figure, these valve assemblies are identical, only assembly 24 will be described to avoid repetition. Valve assembly 24 comprises a sleeve member 26 proportioned to closely fit within chamber 17 and having upper and lower O rings which provide a fluid tight seal with the chamber. An intermediate external portion of the sleeve member has an annular groove 27 through which fluid may pass, such groove being in register with that portion of body passage 22 which terminates at chamber 17. Carried by the lower end of sleeve member 26 is a conventional U shaped annular packing member 28 backed up by a washer member 29. A similar packing member 128 is carried by the upper end of the sleeve member and is backed up by a washer member 129.

Extending through and closely fitting within the packing members 28, and 128 and their respective washer members is an elongated plunger member 30. Note that an annular space 31 defined by the exterior of the plunger and the interior of the sleeve is provided between the two packing members 28, 128. A plurality of openings 32 in sleeve 26 provide for communication between the internal annular space 31 and the external annular space in part defined by the sleeve groove 27. In the present embodiment, the lower end of plunger 30 is provided with an upwardly extending recess 33 and the tubular wall thus formed in the lower end of the plunger has a plurality of radially spaced, axially extending through slots 34 to provide for communication between the interior and exterior of the plunger.

Secured against the upper surface of the valve body 16 and closing respective valve chambers 17, 18 are respective cap members 35 and 36. Since the cap members are similar, only cap 35, which closes valve chamber 17, will be described in detail. Depending from cap 35 is a boss 37 which closely fits within chamber 17 for centering the cap thereover and which abuts the upper end of sleeve 26 to retain the latter seated against the bottom of the chamber. Extending upwardly from the underside of the cap is a pilot cylinder bore 38 which is disposed co-axially with respect to valve chamber 17. Slidable within bore 38 is a pilot piston 39 which is secured to the upper end of plunger 30 by means of a suitable capscrew 40. Piston 39 carries a suitable annular packing member 41 retained in position by a washer 42.

For a purpose later to be disclosed and as illustrated in the drawings, it is an important feature of the present invention that the effective diameter of pilot piston 39 is greater than the effective diameter of plunger 30.

With reference to FIGURE 3, valve body 16 is provided with a passage 43 whose lower end is in communication with port 14 of base 10 and whose upper end is in communication with a passage 44 formed in cap 35. Passage 44 communicates with the upper end of pilot cylinder bore 38 above piston 39 for a purpose to be seen. Although not shown, passages similar to 43 and 44 will establish communication between port 15 of the base and the pilot cylinder bore formed in cap 36.

The means presently employed for holding valve body 16 upon base 10 and for holding cap members 35 and 36 upon the valve body comprises capscrews 45 which pass through apertures in the caps and are threaded into the base. At least certain of the capscrews also pass through apertures formed in the valve body. As will be evident, these capscrews serve the dual purpose of securing the caps to the body and the body to the base.

Referring to FIGURE 5, the present valve is adapted to selectively pass fluid toward and away from, for example, a fluid cylinder 46 of any conventional type. This cylinder may have a piston 47 reciprocable therein and attached to a piston rod 48. Any suitable means may be employed to actuate the valve assemblies 24, 25 by controlling flow of fluid to the pilot cylinder bores of respective cap members 35, 36. At the present time a pair of manually operable pilot valves 49, 50 are employed for this purpose; however, it will readily be apparent that solenoid operated pilot valves could as well be employed if desired.

As illustrated in FIGURE 5, valve inlet port 11 is connected to the discharge side of a suitable fluid pump 51 by means of a conduit 52, valve outlet port 12 is connected to the cylinder 46 by means of a conduit 53, and valve exhaust port 13 is connected to a fluid reservoir 54 (from which pump 51 draws fluid) by means of a conduit 55. A conduit 56 connects port 14 of valve V with valve 49 and conduits 57, 58 respectively connect valve 49 with inlet conduit 52 and with exhaust conduit 55. A conduit 59 connects port 15 of valve V with valve 50 and conduits 60, 61 respectively connect valve 50 with inlet conduit 52 and with conduit 58.

Assuming that pump 51 is operating to maintain fluid pressure in conduit 52 and that pilot valves 49, 50 are in the positions shown in FIGURE 5, it is to be noted that fluid pressure will be admitted above both of the pilot pistons 39 of the respective valve assemblies seen in FIGURE 2. With fluid pressure above the pilot pistons, both valve plungers 30 will be held in their lower-most positions seen in FIGURE 2 wherein fluid flow past the valve assemblies is prevented. Valve plunger 30 of valve assembly 24 is held in the position shown despite the fact that fluid inlet pressure exists beneath this plunger tending to urge it upwardly because, as before mentioned, the effective diameter of piston 39 is greater than the effective diameter of the plunger. Since the same pressure exists beneath the plunger as exists above the piston, the larger diameter of the latter exerts a greater force than the former thus retaining the plunger in the position shown.

If pilot valve 49 is now shifted to its phantom line position, fluid pressure above pilot piston 39 of valve assembly 24 will be exhausted. The inlet fluid pressure beneath this valve assembly's plunger will then urge the plunger upwardly to the position seen in FIGURE 4. Fluid inlet pressure may then pass through this valve assembly to passage 22 and thence to cylinder 46 to forceably shift the latter's piston 47 upwardly. Note that valve assembly 25 blocks flow of fluid to exhaust passage 21 at this time since its pilot piston holds the plunger down, for the reasons aforementioned, despite the existence of the inlet fluid pressure beneath its plunger.

When piston 47 of cylinder 46 has been elevated sufficiently, pilot valve 49 will be returned to its full line position to once again admit inlet fluid above pilot piston 30 of valve assembly 24. This will return the valve assembly to the position seen in FIGURE 2 wherein inlet fluid is once again blocked from outlet passage 22. Since both valve assemblies 24, 25 are now closed, piston 47 of cylinder 46 will neither advance upwardly nor retract downwardly.

When it is desired to return piston 47 of cylinder 46 from its elevated postion to the position seen in FIGURE 5, valve 50 will be shifted to its phantom line position. This will exhaust the fluid pressure above pilot piston 39 of valve assembly 25 to thus permit the fluid under pressure in outlet passage 22 to shift the valve plunger of this valve assembly upwardly to a position similar to that seen in FIGURE 4. With the plunger of valve assembly 25 thus positioned, fluid presure in the outlet passage 22 and that beneath piston 47 of cylinder 46 will be exhausted through passage 21 and conduit 55 to the reservoir 54. Piston 47 will thereupon be returned to its lowermost position seen in FIGURE 5 by any suitable means such as a spring, not shown, or the like. If complete return of piston 47 is not desired, valve 50 will momentarily be shifted, as before described and then returned to its full line position.

It is to be understood that while valve assemblies 24, 25 have been described as being independently operable, they could be operated simultaneously where it is not essential to hold piston 47 of cylinder 46 in positions intermediate its lowermost and uppermost positions. In such a case, one of the valve assemblies 24, 25 would be normally open and the other normally closed instead of both being normally closed as seen in FIGURE 5 and as previously described. Additionally valves 49, 50 would, in such case, be simultaneously shiftable to simultaneously close the normally open valve assembly and open the normally closed valve assembly.

As earlier mentioned, one of the principal objects of the present invention is to provide a valve which may readily be changed from plunger type to poppet type. The plunger type valve assemblies 24, 25 having now been described, attention is now called to FIGURE 6 wherein there is illustrated a poppet type valve assembly 62 which may be substituted for either of the valve assemblies 24, 25.

Assuming valve assembly 62 to be substituted for valve assembly 24, the construction thereof is as follows: Valve assembly 62 comprises a sleeve member 63 whose exterior, overall dimensions are identical with sleeve 26 so that it will fit within valve chamber 17 in an identical manner. An intermediate, external portion of sleeve 63 has an annular groove 64 similar to the groove 27 of sleeve 26. Carried by the upper end of sleeve 62 is an annular packing member 65, similar to member 128, and a washer member 66, similar to member 129. For a purpose to appear, the lower bore portion of sleeve 63 has a plurality (herein shown to be four) of radially spaced, longitudinally extending grooves 67 (see FIGURE 7). Sleeve 63 also has a plurality of transversely extending openings 68 (similar to openings 32) which establish communication between the bore of the sleeve and the space in part defined by its annular groove 64.

Slidable within sealing member 65 and its backup washer 66 is a valve stem 69 having a valve head 70 at its lower end of an external size to slide within the sleeve bore. The underside of head 70 is recessed to receive a washer 71 of rubber or other resilient material. A capscrew 72 passes through the washer and the valve head and is threaded into the valve stem to hold the parts assembled. In the position of parts, shown, washer 71 is seated against an annular rib 73 formed in an apertured, disk-like member 74 carried by the lower end of the sleeve member 63. Member 74, as will be evident, thus provides a seat for the valve head against which the latter closes. Secured to the upper end of valve stem 69 by means of a capscrew 75 is a pilot piston 76 which is slidable within bore 38 of cap member 35. Piston 76 carries an annular sealing member 77 and a retaining washer 78.

Operation of valve assembly 62 is similar to valve assembly 24 in that so long as inlet pressure exists above pilot piston 76, the latter will exert a force sufficient to hold valve head 70 upon its seat to thus block flow of fluid through the valve assembly. When, however, fluid is exhausted from above the pilot piston, inlet fluid pressure beneath the valve head will force the latter upwardly from its seat. Inlet fluid will then flow upwardly past piston 70 through the sleeve grooves 67 to the exterior of the sleeve and to the outlet passage 22 through the sleeve apertures 68. Readmission of inlet fluid above piston 76 will return the valve parts to the closed position shown since the force exerted by piston 76 is greater than the force exerted by the valve head 70.

From the foregoing, it will be understood that either or both of the plunger type valve assemblies seen in FIGURE 2 may readily be replaced by a poppet type valve assembly such as seen in FIGURE 6 merely be removing the appropriate cap member, with-drawing the plunger type valve assembly, inserting a poppet type valve assembly, and replacing the cap. Obviously, substitution of a plunger type valve assembly for a poppet type valve assembly will be effectuated in a similar manner. Furthermore, it will be evident that a malfunctioning or worn valve assembly may be replaced in the same way by substituting therefore a valve assembly of the same type.

In the embodiment seen in FIGURE 8, there is shown a valve 79 having a valve body 80. Valve body 80 has an internal valve chamber 81 and respective inlet and outlet ports 82, 83. Disposed within chamber 81 is a plunger type valve assembly 131. This valve assembly comprises sleeve means 184 in part provided by a sleeve member 84 having at its outer end a radially extending flange 85 presently secured to the valve body by means of radially spaced-apart bolts and nuts 86. The inner end of sleeve 84 carries an annular sealing member 87 backed up by a ring member 88.

Also disposed within the valve chamber 81 and forming a part of the sleeve means and spaced inwardly of the chamber from the inner end of sleeve 84 is another annular sealing member 89 backed up by a washer member 90. Also forming a part of the sleeve means and extending between and spacing the inner end of sleeve member 84 form washer member 90 is a tubular spacer member 91 having a plurality of axially extending, radially spaced-apart, traversely extending apertures 92 which provide for free circulation of fluid between the interior and the exterior of the spacer member.

Slidable within sealing members 87, 89 and their respective backing members 88, 99 is a hollow plunger 93 whose outer end is closed. The inner, hollow end of plunger 93 has a plurality of axially extending, radially spaced-apart transverse apertures 94 which provide for free flow of fluid between the interior and the exterior of the sleeve member. Extending through a threaded aperture in the closed end of plunger 93 is a piston rod 95 which extends outwardly of the valve body and through a suitably sealed aperture formed in a transverse wall 96 at the outer end of the sleeve member 84. Piston rod 95 may have threaded connection with plunger 93 or be otherwise suitably secured thereto for movement therewith.

A piston 97 is carried by piston rod 95 adjacent the outer end of plunger 93 and is reciprocable within a bore 98 formed interiorly of the sleeve member. Piston 97 carries a suitable sealing member 99 and the effective diameter of such piston is somewhat larger than the effective diameter of plunger 93 for a purpose to appear. The inner end of piston rod 95 is hollow, as seen at 100, such hollow end being intersected by a transverse aperture 101 spaced outwardly of piston 97 to thus place bore 98 in communication with inlet fluid pressure. A cap 102 provided with an orifice 103 is threaded onto the inner end of piston rod 95 to restrict flow of fluid through its hollow interior.

Secured to the outer end of piston rod 95 and shiftable therewith is a piston 104 which is slidable within a bore 105 provided by a cap member 106. Bore 105 is preferably larger than bore 98 for a purpose to appear. Bolts 107 may conveniently secure cap 106 to flange 85 of the sleeve member 84. A passage 108 is provided in the sleeve member flange for admitting fluid under pressure to the inside face of piston 104.

Assuming that inlet port 82 of valve 79 is connected with a source of inlet pressure, the parts will be retained in the position shown in FIGURE 8 wherein fluid flow through the valve is blocked since the fluid pressure in bore 98, acting against piston 97 which is larger in effective diameter than plunger 93, will exert a force greater than the force exerted by the plunger. If, however, fluid under pressure from any suitable source (such as fluid from the same source which supplies inlet port 82) and under the control of any suitable valve (not shown) is admitted into passage 108, piston 104 and its connected parts will move outwardly to the position seen in FIGURE 9. With the parts positioned as seen in the latter figure, slots 94 in sleeve 93 will be positioned between the sealing members 87, 89 to provide for fluid flow from the inlet port 82 through slots 94 in plunger 93 and slots 92 of spacer 91 to the outlet port 93.

When it is desired to once again close the valve by returning its parts to the position seen in FIGURE 2, fluid in passage 108 will be exhausted to thus permit piston 97 (which, it will be recalled, exerts a greater force than does plunger 93) to return the parts from the position seen in FIGURE 9 to the position seen in FIGURE 8.

In the event it is desired to change the valve seen in FIGURE 8 from the plunger type of valve mechanism therein shown to a poppet type of valve mechanism, the valve assembly 181 seen in FIGURE 8 may be withdrawn from the valve chamber 81 and a poppet type valve assembly 109, such as seen in FIGURE 10, substituted therefor.

Valve assembly 109 comprises sleeve means 110 having the same outside dimensions as sleeve means 184 so that it will interchangeably fit within valve chamber 81. Sleeve means 110 includes a flanged sleeve member 111 which is similar to the previously described sleeve member 84 and in common therewith provides a cylinder bore 112. Such sleeve means also includes a packing member 113, a backup ring 114, an apertured, annular member 115 having an annular seat 116, and a tubular, transversely apertured spacer member 117 which extends between and spaces the annular member 115 from the sleeve member 111.

Slidable within packing member 113 and ring member 114 is a valve stem 118. Stem 118 has a longitudinally extending aperture 119 therethrough whose portion adjacent the outer end of the stem is enlarged in diameter and threaded to receive a piston rod 120. Carried by piston rod 120 adjacent the valve stem is a piston 121 which is slidable in the cylinder bore 112 of the sleeve member. The inner end of piston rod 120 is apertured in the same manner and for the same purpose as the previously described piston rod 95. Carried by the inner end of valve stem 118 is a valve head 122 having a recess for receiving a ring-like, resilient body 123 which is adapted to engage the annular seat 116. Valve head 122 is slidable within spacer member 117 and the former, together with body 123, is secured to the valve stem by means of an apertured plug 124 retained in position by capscrews 125 which pass through suitable apertures in the plug and which are threaded into the valve stem. Secured to the outer end of piston rod 120 is the previously described pilot piston 104 which is reciprocable within the bore 105 of the cap member 106 secured to the flange of sleeve member 111.

Operation of poppet valve assembly 109 is similar to plunger valve assembly 181, it being understood that when fluid under pressure is admitted beneath piston 104 of this assembly, valve head 122 (together with the resilient body 123) will be shifted away from annular seat 116 (against the urging of piston 121) to the positions seen in FIGURE 11 to thus permit fluid flow through the annular member 112, through the apertured, tubular spacer member 117, and to the outlet port 93. When fluid beneath piston 104 is exhausted, piston 121 will return the parts to the position seen in FIGURE 10 since this last mentioned piston is so related to the size of the valve seat 116 that it exerts a greater force than that exerted by valve head 122.

Clearly, when it is desired to substitute one of the valve assemblies 181, 109 for the other, it is only necessary to remove cap 106 and nuts 86 whereupon the valve assembly which is to be replaced may be withdrawn from the valve bore 81. The other valve assembly may then be inserted within the valve chamber, the piston 104 transferred from the removed valve assembly to the substituted valve assembly, and the cap once again replaced.

While the two valve assembly types disclosed in FIGURES 8 and 10 have been shown and described as being operated by a pilot cylinder which employs fluid pressure such as the same fluid pressure which exists at inlet port 82, it is to be understood that fluid pressure of another kind, such as air under pressure, may be employed to actuate either valve assembly. When such is the case, the construction seen in FIGURE 12 may be employed. In this construction, a larger pilot piston is required because the amount of air pressure usually available is relatively low. Accordingly, to develop the required force, the piston must have considerable area.

In this embodiment and assuming a valve poppet type valve assembly 109a similar to assembly 109 is employed, the sleeve 111a will be provided with a larger flange portion than before to accommodate a larger cap member 106a having an enlarged bore 105a. Secured to the outer end of piston rod 120a and reciprocable within bore 105a is an enlarged pilot piston 104a. Operation of this embodiment is similar to that theretofore described in that when air is admitted beneath piston 104a, the valve parts will be shifted to the right to unseat the valve head and thus pass fluid from the inlet thereof to its outlet. When the air beneath this piston is exhausted, piston 121a will return the valve parts to closed position.

It is to be understood that while the enlarged pilot piston has been shown and described as being applied to a poppet type valve assembly, it may also be applied to a plunger type valve assembly as well.

In view of the foregoing, it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:
1. A valve for controlling flow of pressurized fluid, comprising a valve housing having a bore extending inwardly of one face thereof, a sleeve removably disposed within said bore and having a radially outwardly extending flange seated against said housing face, a valve member reciprocable within said sleeve and having a portion extending outwardly of said valve housing and beyond said sleeve flange, a piston carried by said outwardly extending valve member portion, and means removably secured to said sleeve flange and providing a cylinder bore in which said piston is reciprocable.

2. The construction of claim 1 wherein said sleeve provides a radially inwardly extending flange adjacent said radially outwardly extending flange for closing said sleeve and through which said valve member portion extends.

3. A valve for controlling flow of pressurized fluid, comprising a valve body provided with spaced-apart faces, a recess entering from one of said faces, and a pair of fluid passages communicating with said recess, a valve member shiftable within said body recess to control fluid flow through said passages and having a portion projecting beyond said one body face through the recess opening, a cap member abutting said one body face, closing said body recess, and having means therein for effecting valve member movement, a base member abutting said other body face and having fluid passages communicating with said body passages, and fastening means extending between said cap member and said base member for drawing such members toward each other to clamp said valve body therebetween.

4. The construction of claim 3 wherein said valve member portion provides a piston and wherein said cap member provides a cylinder in which said piston is reciprocable.

5. A valve for controlling flow of pressurized fluid, comprising a valve housing having a bore formed therein, a sleeve removably disposed within said bore and having an annular recess entering from one end thereof, a disk-like member removably disposed in said sleeve recess and having an annular rib facing away from said one sleeve end and forming a valve seat, and a valve member closely fitting within said sleeve for reciprocable movement therein toward and away from said valve seat, said valve member having a resilient insert in the end facing said valve seat, said resilient insert being adapted to seat on and in sealing engagement with said rib.

6. A valve for controlling flow of pressurized fluid, comprising a valve housing having a bore formed therein, said bore having a flat bottom, a sleeve removably disposed within said bore and having an annular recess entering from one end thereof, a disk-like member removably disposed in said sleeve recess and providing a valve seat, an annular sealing member disposed between said disk-like member and the bottom of said bore to prevent fluid leakage about the exterior of said sleeve, and a valve member closely fitting within said sleeve for reciprocable movement therein toward and away from valve seat engagement.

7. A valve for controlling flow of pressurized fluid, comprising a valve housing having a bore entering from one end thereof and axially communicating interiorly of said housing with a bore of lesser diameter to form a transverse shoulder therebetween, a rigid sleeve axially and removably disposed within said bore and having a recess entering from one end thereof, a rigid disk-like member removably disposed in said sleeve and providing a valve seat on the side directed inwardly of said sleeve, and valve seat being adapted to cooperate with a valve head for controlling flow of fluid between said bore and said bore of lesser diameter, said disk-like member having its opposite side adjoining said shoulder, a cap member secured against said housing end and pressing against the opposite end of said sleeve to hold said sleeve one end rigidly against said shoulder and thus prevent axial movement of said sleeve, said sleeve in turn holding said disk-like member in position relative to said shoulder, and a valve member within said sleeve and reciprocable axially thereof, said valve member carrying said valve head.

8. A valve for controlling flow of pressurized fluid, comprising a valve housing having a bore entering from one end thereof and axially communicating interiorly of said housing with a bore of lesser diameter to form a transverse shoulder therebetween, a rigid sleeve axially and removably disposed within said bore and having a recess entering from one end thereof, a rigid disk-like member removably disposed in said sleeve recess and providing a valve seat on the side directed inwardly of said sleeve, said valve seat being adapted to cooperate with a valve head for controlling flow of fluid between said bore and said bore of lesser diameter, said disk-like member being of a width substantially equal to the depth of said sleeve recess and having its opposite side adjoining said shoulder, a recessed O-ring seal between said shoulder and said opposite side of said disk-like member, a cap member secured against said housing end and pressing against the opposite end of said sleeve to hold said sleeve one end rigidly against said shoulder, said sleeve in turn pressing against said disk-like member to compress said O-ring against said shoulder, and a valve member within said sleeve and reciprocable axially thereto, said valve member carrying said valve head.

References Cited in the file of this patent

UNITED STATES PATENTS

| | | |
|---|---|---|
| 74,597 | Rodier | Feb. 18, 1868 |
| 713,161 | Scott | Nov. 11, 1902 |
| 770,416 | Beaumont | Sept. 20, 1904 |
| 1,588,659 | Christensen | June 15, 1926 |
| 1,793,850 | Halstead et al. | Feb. 24, 1931 |
| 1,878,822 | Dewandre | Sept. 20, 1932 |
| 2,047,120 | Stout | July 7, 1936 |
| 2,398,811 | Stacy | Apr. 23, 1946 |
| 2,517,406 | Mott | Aug. 1, 1950 |
| 2,549,010 | Rhodes | Apr. 17, 1951 |
| 2,632,622 | Carnahan | Mar. 24, 1953 |
| 2,671,431 | Zumbusch | Mar. 9, 1954 |
| 2,672,886 | Crookston | Mar. 23, 1954 |
| 2,825,526 | Zuiderhoek | Mar. 4, 1958 |
| 2,834,368 | Gray | May 13, 1958 |
| 2,952,246 | Collins | Sept. 13, 1960 |
| 2,969,091 | Wolff | Jan. 24, 1961 |